United States Patent Office

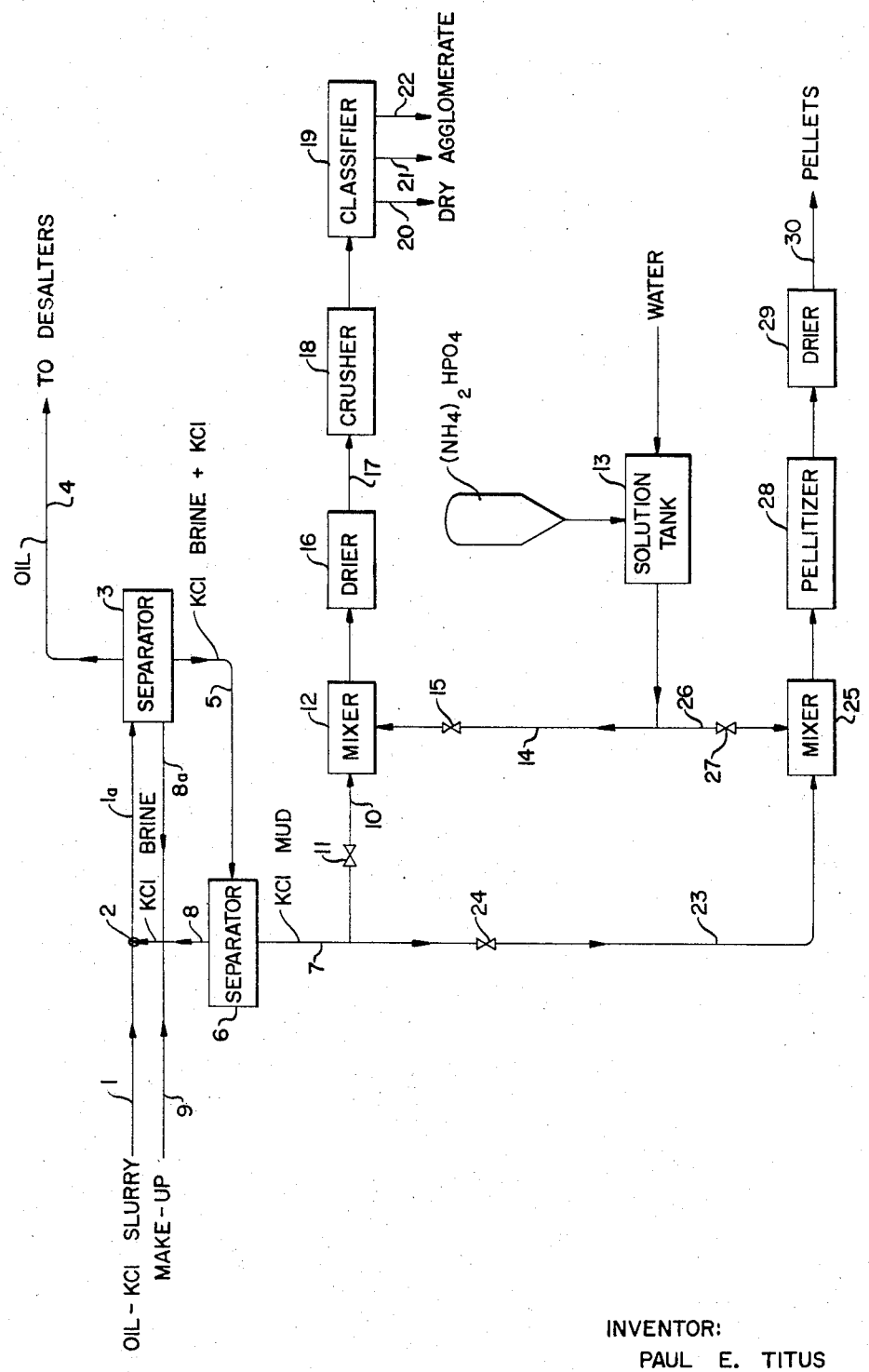

3,378,363
Patented Apr. 16, 1968

3,378,363
METHOD OF IMPARTING HARDNESS ON WATER-SOLUBLE PARTICLES
Paul E. Titus, Houston, Tex., assignor to Shell Oil Company, New York, N.Y., a corporation of Delaware
Filed Feb. 23, 1965, Ser. No. 434,587
10 Claims. (Cl. 71—64)

ABSTRACT OF THE DISCLOSURE

Particles of water-soluble crystalline material are mixed with a hardener material, which is also water soluble. Water is added to form a slurry. The slurry is by the hardener material.

---

The invention relates to reconstituting or agglomerating finely subdivided, water-soluble organic or inorganic solid material to produce agglomerates of the material in crystalline form larger than the original particles. In one aspect the invention is concerned with the formation or reconstitution of particles such as salts and hydroxides to produce larger particles less subject to forming dust and more suitable for such uses as commercial fertilizer application. In another aspect, it is concerned with the production of a balanced fertilizer.

Crystalline materials, such as salts, are frequently encountered in the form of small particles, with diameters smaller than 50 microns to a thousand microns. As a specific example, sylvite of fertilizer grade, soda ash, phosphate rock, and other materials can be transported through a pipe line as a slurry in crude or refined oil, provided that it is dispersed as granules small enough and in proper concentration to prevent rapid settling through the carrier oil, or that a sufficient amount of small particles are present together with larger particles to prevent rapid settling. The very nature of the solids that yield a good slurry may require such small particle sizes as to limit severely the use of the recovered solids. In the case of sylvite (KCl) transported in a crude oil slurry, approximately one-half of the solids are of a particle size too small to be suitable for commercial fertilizer application. Therefore, reconstitution of the recovered sylvite to larger particles is necessary.

The present invention provides a method for reconstituting such small particles after recovery from an oil slurry by agglomerating them with a hardener salt which binds the individual particles. The invention may, if desired, be applied also for the purpose of producing a balanced fertilizer in which the hardener salt is a desired ingredient, together with the particles of fertilizer salt agglomerated thereby.

In summary, according to the invention the particles of water-soluble crystallizable material are mixed with a hardener material, usually a salt, which is also water-soluble, selected as described in the sequel, the total amount of water in the resulting mixture being restricted so as to prevent more than a minor amount of the particled material to dissolve, and the mixture is then dried to form agglomerates of the particles bound by the hardener material. Within the hardened mass, each particle consists of a core of the material which is hardened, surrounded by the residue of a solution of the said material and the hardening material, and the latter residues of adjoining particles are joined to form the agglomerates. The agglomerates may be pelletized before drying and/or crushed after drying into particles of desired size, larger than the original particles.

The hardener material may be added to the particled material to be hardened as an aqueous solution or, when the latter material is in the form of a mud or slurry, in dry, comminuted form.

For convenience, the material to be hardened is hereafter at times called the material A, and the hardener material, the additive B. As will appear, the hardening is accomplished by replacing inter-crystal attractions between like crystals A with attractions of greater strength involving the additive B, namely, intercrystal attractions between A and B and also between B and B. Because the hardening is accomplished by interaction between the co-crystallized material A and the additive B, each particled material A can be hardened by any of a number of different additives B. It may be noted that the class of particled materials to be hardened or agglomerated and the class of hardener materials are not exclusive, but in any specific situation the hardener material is different from that being hardened or agglomerated. Thus, a given material may be hardened by another material but may itself be a hardener for a third material.

In the present invention the following criteria obtain:

(1) Both the hardening additive B and the particle-form material A must be water-soluble and occur in the crystalline form after drying. (This does not preclude the use of amorphous starting material, so long as the materials are crystalline after agglomeration and drying.) It is evident that hydrates may have crystalline form; hence both the material A and the additive B may be hydratable. Also, either may be organic or inorganic.

(2) The additive B acts as a hardener, i.e., increases the resistance to attrition, when inter-crystal attraction A—A (i.e., between like crystals of material A alone) is less than the inter-crystal attraction (a) A—B (i.e., between unlike crystals of the hardener B and the particle material A), or (b) B—B (i.e., between like crystals of the material B alone). The effects of (a) and (b) differ in accordance with the concentration of the additive B; hence, in general, it is the weighted average of A—B and B—B that should exceed A—A.

The inter-crystal attractions may be expressed in any consistent units, on a scale that indicates resistance to attrition, e.g., minutes to attrite a given percentage of the material under like attrition, e.g., such as those described in the appended examples. The weighting of these values is achieved by determining the attractions as functions of the hardener concentration. This relationship will indicate the inter-crystal attractions attributable to A—A (at 0% B), A—B (with allow concentration of B) and B—B (at high concentrations of B).

It is evident that reference to the average of two attractions in the foregoing in many systems leads to the result that small amounts of additive B produce greater hardening effects than larger amounts. For example, in a system wherein sylvite (A) is hardened by diammonium phosphate (B), the inter-crystal attractions on a consistent, arbitrary scale were: A—A=1; A—B=5; B—B=2. When a small amount, up to 1% w., of B is added to A to form an enveloping solution which is later dried, at the particle surface the 1 unit attraction A—A is replaced by 5 units of attraction A—B; hence the hardness of the particle is improved. (The attraction B—B, of 2 units, is small because of the low amount of B present and may be disregarded.) However, hardness does not continue to increase with increasing amounts of B after about 2% w. of B are added because of the increasing effect of the lower attraction B—B of only 2 units, which becomes increasingly significant and progressively replaces the 5 units of the A—B attraction. Hence the degree of hardening accomplished by the additive B is dependent not only upon the relative strengths of the inter-crystal attractions (A—A, A—B and B—B) but also upon the concentration of the additive B in the particled material A.

By way of further illustration, on the same arbitrary scale, ammonium sulfate (B') has the properties: A—B'=2, B'—B'=3 and B—B'=2. Ammonium sulfate will harden sylvite by replacing 1 unit of attraction with 3 units at low concentrations, and with a weighted average of 3 and 2 units at higher concentrations.

While, from the foregoing data, sylvite and diammonium phosphate will each weaken ammonium sulfate at relatively low concentrations, a synergism is observed when they are added together. In this instance, no weakening is observed because 3 units of attraction (B'—B') are replaced with both 5 units of attraction (A—B) and 2 units of attraction (A—B' and B—B'). [It should be noted that the letters A, B and B' were, for clarity, unchanged from the preceding two paragraphs, although in this case ammonium sulfate (B) is the particled material.]

It is evident from the foregoing that the invention is not restricted to the use of single-component additive materials. Similarly, the material to be hardened may comprise more than one constituent.

The invention is applicable to the reconstituting of any of a variety of organic and inorganic water-soluble materials, especially salts. Examples of such material A are the class consisting of the inorganic salts sylvite, and ammonium sulfate. However, the invention may also be applied to a variety of materials such as phosphate rock and soda ash. The material A may exist in the form of small dust-like particles, up to particles having sizes like sand grains, and may be initially dry or moist; in the latter case it may be a thick water slurry or mud containing only a small amount of water, i.e., less than about 20%.

The thick water slurry mentioned above may be produced, for example, when inorganic materials are recovered from an oil slurry. When such materials are dispersed in crude or refined oil for transport through a pipe line they are separated from the oil at the delivery end of the pipe line; some of the separation techniques result in the formation of an aqueous slurry. According to one such technique, called the phase transfer method, the oil slurry is brought into intimate contact with a strong or saturated brine, e.g., water containing dissolved the same inorganic materials as that dispersed in the oil. The brine preferentially wets the material dispersed in the oil and such material is transferred into the brine phase upon being brought into contact. After separation of the brine phase from the oil, the transferred particles are separated from the brine by filtration or settling, to produce a moist filter cake or sediment, above referred to as the slurry. This slurry would, in the phase-transfer method, be dried by heating; however, according to the instant invention it is subjected to the reconstituting treatment witht he hardening salt prior to drying to produce agglomerates or pellets of improved size and physical characteristics.

Examples of the additive B are the preferred class consisting of diammonium phosphate, ammonium sulfate, ammonium nitrate, potassium phosphate and urea. However, a variety of other salts may also be used, among which are tricalcium phosphate, potassium dichromate and hydrated ferrous sulfate ($FeSO_4 \cdot 7H_2O$).

The additive B, before admixing to the particled material A, is preferably dissolved in water to form a solution of sufficient concentration to avoid introducing into the resulting mixture an excess of water which would tend to dissolve a large part of the material to be reconstituted. In general, it is desired that the water in the resulting mixture be insufficient to dissolve more than one-fourth of the particled material, so that the additive forms a solution with the material A only at the surface of the particle. For example, additive B may be introduced as a brine which is highly concentrated or saturated.

However, the additive B can be added in dry form to wet particled material A provided enough water is present in the resulting mixture to dissolve all or a major part of the additive.

The quantity of the additive B can be varied within wide limits depending upon the desired physical and chemical characteristics of the reconstituted material, and amounts from .05 up to 50% of the amount of particalized material may be used. Thus, if the principal object is to produce agglomerates or pellets, amounts below 5% are normally used. Within this low range of additives, or at least within a part of this range, the amount of the additive tends to produce harder reconstituted particles, having regard to the specific bonding characteristics of the different hardening salts.

However, the invention may also be applied to produce a balanced fertilizer, in which the hardening additive is itself a desired constituent of the final product, e.g., a plant nutrient. In such case amounts above 5%, e.g., 10% to 50%, are used, although the use of greater amounts may often produce a negligible or no improvement on the physical characteristics of the resulting material, as is evident from the foregoing discussion of sylvite and diammonium phosphate.

The invention will be further described with reference to the accompanying drawing forming a part of this specification, the single view of which is a flow diagram of one illustrative embodiment of the process.

Referring to the drawing, the invention is illustrated as applied to the reconstitution of sylvite in the form of a slurry resulting from the phase-transfer recovery from an oil slurry. The said oil slurry is supplied from a pipe line at 1, and mixed with saturated KCl brine at a mixing point 2. The resulting mixture flows to a separator, such as a settler 3, and in the section of pipe 1a following the mixing point 2 most or all of the sylvite is transferred to the brine phase. The oil is discharged from the top of the separator through a line 4 for utilization or further desalting. The brine, containing sylvite crystals in suspension, is transferred via line 5 to a second separator 6, such as a thickener, to produce a thick slurry or mud of sylvite, which is discharged through a conveyor 7. The brine, freed from the crystals, is recycled to the point 2 via line 8. Make-up brine is supplied continuously or intermittently at 9.

The separator 3 may be designed to settle the entering mixture into oil, brine and mud layers. In this case the brine is drawn off through a line 8a and the mud flows through the line 5.

The KCl mud contains small sylvite particles which may lie within either a narrow or a wide range of particle sizes, depending on the source, usually between 50 and 1000 microns in diameter, and may contain small or trace amounts of oil. A first part of this mud is flowed through a suitable conveyor 10 and flow control device 11 to a mixer 12 wherein it is mixed with a concentrated solution of the hardener material or additive B. The latter is prepared in a solution tank 13, to which water and the dry additive—diammonium phosphate in this example—are supplied and from which it is flowed through a pipe 14 and valve 15. The solution of hardener is permitted to come into intimate contact with the mud within the mixer 12, as by stirring, and the resulting mixture is passed to a drier 16, such as a vacuum drier or rotary film. The product consists of agglomerates, which are discharged at 17. Optionally, these agglomerates may be crushed in a mill 18 and classified according to particle sizes in a classifier 19, from which products of various particle sizes are discharged at 20, 21 and 22. If desired, the fines may be returned to the mixer 12 and/or the coarsest particles may be returned to the crusher 18.

A second part of the mud is flowed through a conveyor 23 and flow control device 24 to a second mixer 25, wherein it is intimately mixed with the solution of additive from the tank 13, supplied via a pipe 26 and valve 27. The resulting mixture is passed to a pelletizing unit 28 which may, for example, include calender rolls, and the wet pellets are dried in a drier 29, such as a vacuum drier. The dried pellets are discharged at 30.

The described dual series of mixers and driers, apart from illustrating alternative arrangements, may be used to advantage in combination for preparing reconstituted materials of widely different chemical compositions. For example, flow through the control device 11 and valve 15 may be such that only a small amount, say 0.1 to 2% of the hardener additive, is added to the sylvite in the mixer 12. The materials discharged at 20–22 in this case consist principally of sylvite and the hardener acts principally as a binder. On the other hand, the control device 24 and valve 27 may be set to add from 15–50% of the hardener additive to the sylvite in the mixer 25; the pellets discharged at 30 in this case contain a significant amount of diammonium phosphate and are suitable for use as a balanced fertilizer.

EXAMPLE I

A moist mud of potassium chloride contained particles having (in dry form) size-distribution shown in the third column of Table I:

TABLE I

| U.S. Sieve No. | Sieve Opening, microns | Particles, Percent w. | |
|---|---|---|---|
| | | KCl | $(NH_4)_2SO$ |
| Retained on: | | | |
| 30 | 590 | 18.9 | 58.8 |
| 50 | 297 | 23.3 | 29.5 |
| 100 | 149 | 11.3 | 10.7 |
| 200 | 74 | 10.8 | 0.8 |
| 325 | 44 | 12.1 | 0.0 |
| Passed 325 | | 23.6 | 0.2 |

The mud initially contained about 15% water, saturated with KCl, and a small amount, about 1% w., of oil. One part of this mud was pelletized to produce 2 in. diameter pellets and dried in a vacuum drier at 160° F. for about 17 hours, until its moisture content was reduced to less than about 0.2% w. Two portions of this control product, identified as product A, were subjected to attrition in a test sieve shaker by tapping it in a No. 12 sieve for two successive periods of 30 minutes. The percentages by weight of the attrited agglomerates passing and retained on sieves of different meshes after each period is shown in Table II.

Four other parts of this mud were mixed with varying amounts of diammonium phosphate, which hardener additive was added in dry form to the wet mud. The resulting mixture was pelletized into 2-inch pellets and similarly dried to produce pellets identified as B, C, D and E. Different portions of these pellets were attrited for varying times and tested as noted above.

Three other parts of the mud were treated as described in the preceding paragraph except that the hardener was ammonium sulfate, to produce pellets F, G and H.

Table II gives the amounts of hardener salts added as percent by weight of the dried cake, and the results of the test.

TABLE II.—ATTRITION TEST OF 2-INCH AGGLOMERATES

| U.S. Bureau of Standards Sieve No. | 12 | 16 | 30 | 30 |
|---|---|---|---|---|
| Sieve Opening, mm. | 1.68 | 1.19 | 0.59 | |
| | Retained Percent w. | | | Passed Percent w. |
| (A) Dried KCl cake (no added salt), sieve time: | | | | |
| 30 min | 42.9 | 1.7 | 19.0 | 36.4 |
| 60 min | 19.3 | 2.8 | 28.6 | 49.3 |
| $(NH_4)_2HPO_4$ added (basis dried cake) | | | | |
| (B) 0.1% w.: | | | | |
| 30 min | 80.8 | 1.0 | 6.0 | 12.2 |
| 60 min | 65.5 | 1.9 | 9.3 | 23.3 |
| (C) 0.3% w.: | | | | |
| 30 min | 84.0 | 1.0 | 5.4 | 9.6 |
| 60 min | 78.2 | 1.2 | 6.1 | 14.5 |
| (D) 1.7% w.: 30 min | 92.1 | 0.5 | 2.6 | 4.8 |
| (E) 30% w.: | | | | |
| 30 min | 92.3 | 0.2 | 2.5 | 5.0 |
| 60 min | 85.2 | 1.1 | 3.4 | 9.3 |
| $(NH_4)_2SO_4$ added (basis dried cake) | | | | |
| (F) 0.3% w.: | | | | |
| 30 min | 59.1 | 2.1 | 13.8 | 25.0 |
| 60 min | 35.5 | 3.2 | 20.1 | 41.2 |
| (G) 0.6% w.: 30 min | 68.4 | 2.6 | 11.2 | 17.8 |
| (H) 1.7% w.: 30 min | 78.8 | 1.4 | 6.8 | 13.0 |

It is evident that the hardener made the agglomerated pellets more resistant to attrition and that the use of increasing amounts of hardener improved the hardness in the lower concentrations (compare samples B, C and D or F, G and H), while using a larger quantity was not detrimental (compare samples D and E).

EXAMPLE II

A mud of ammonium sulfate contained 13% water and 87% w. of particles having (in dry form) the size distribution shown in the fourth column of Table I and was free from oil. A control sample I was treated without hardener additive and three samples J, K and L were mixed with the salts indicated in Table III as additives B in amount to yield 1% w. on a dried cake basis. In each the ammonium sulfate salts was pelletized into 2″ x 3″ agglomerates and dried under vacuum at 180° F. for 17 hours. Attrition tests were then performed in a test sieve shaker for a period of 30 minutes, using a No. 16 sieve. The attrition resistances of the agglomerates are evident from the data in Table III:

TABLE III.—ATTRITION TEST OF 2″ x 3″ AGGLOMERATES

[Sieve time 30 minutes]

U.S. Bureau of Standards Sieve No. ------------ 16
Sieve opening, mm. -------------------------- 1.19

Retained, percent w.
A. Dried $(NH_4)_2SO_4$ cake (no added hardener) ---- 83.0
B. 1% w. of $FeSO_4 \cdot 7H_2O$ added --------------- 91.5
C. 1% w. of $K_2SO_4$ added ---------------------- 90.5
D. 1% w. of urea, $(NH_2)_2CO$ added ----------- 94.2

In each instance, the hardener salt is also a plant nutrient and could be added in larger amounts to produce a balanced fertilizer.

I claim as my invention:

1. A method of reconstituting and hardening (A) water-soluble particles having diameters of less than 1000 microns to particles of larger dimensions and which are resistant to attrition, selected from the group consisting of potassium chloride, sylvite, potash and soda ash comprising contacting said water-soluble particles with less than 50% of (B) water-soluble hardeners selected consisting of diammonium phosphate, ammonium sulfate, potassium phosphate, potassium dichloronate, tricalcium phosphate, hydrated ferrous sulfate and urea, forming a slurry of the mixture of (A) and (B) with less than 20% water, thereafter mixing and drying the mixture to remove the water and forming an inter-crystalline product of water-soluble particles (A)–(B).

2. The method of claim 1 wherein (A) is sylvite and (B) is diammonium phosphate, said diammonium phosphate being present in an amount of from 0.5% to 5% of the mixture.

3. The method of claim 1 wherein (A) is sylvite and (B) is diammonium phosphate, said diammonium phosphate being present in an amount of less than 2%.

4. The method of claim 1 wherein (B) is a mixture of diammonium phosphate and ammonium sulfate.

5. The method of claim 1 wherein (A) is potash and (B) is diammonium phosphate, said diammonium phosphate being present in an amount of from 0.5% to 5%.

6. Method as defined in claim 1 wherein said solid material A is potassium chloride having diameters between 50 and 1000 microns, and which, prior to admixture with additive B, is provided on its surface with a minor amount of an oil coating.

7. Method as defined in claim 6 wherein said oil coating comprises essentially about 1% by weight of said solid material A.

8. A method of transporting through a pipeline a slurry of water thickened water-soluble solid particles dispersed in a liquid hydrocarbon, transporting said slurry to a terminal station, recovering the solid particles from the liquid hydrocarbon phase and reconstituting and hardening the water-soluble particles by admixing and slurrying them with less than 50% of a water-soluble hardening agent in less than 20% water and thereafter drying the mixture to remove the water and forming an intercrystalline product of the water-soluble particles and the hardening agent.

9. The method of claim 8 wherein the water-soluble particles are selected from the group consisting of potassium chloride, sylvite, potash and soda ash and the hardening agent is selected from the group consisting of diammonium phosphate, ammonium sulfate, potassium phosphate, potassium dichloronate, tricalcium phosphate, hydrated ferrous sulfate and urea.

10. The method of claim 8 wherein the water-soluble solid particles are sylvite particles and the hardening agent is diammonium phosphate.

References Cited
UNITED STATES PATENTS 2,770,539  11/1956  Martenet _____ 71—64

DONALL H. SYLVESTER, Primary Examiner.

R. BAJEFSKY, Assistant Examiner.